May 7, 1946. F. H. HOPKINS 2,399,737
PRESSURE ACTUATED CONTROL DEVICE
Filed Jan. 19, 1944
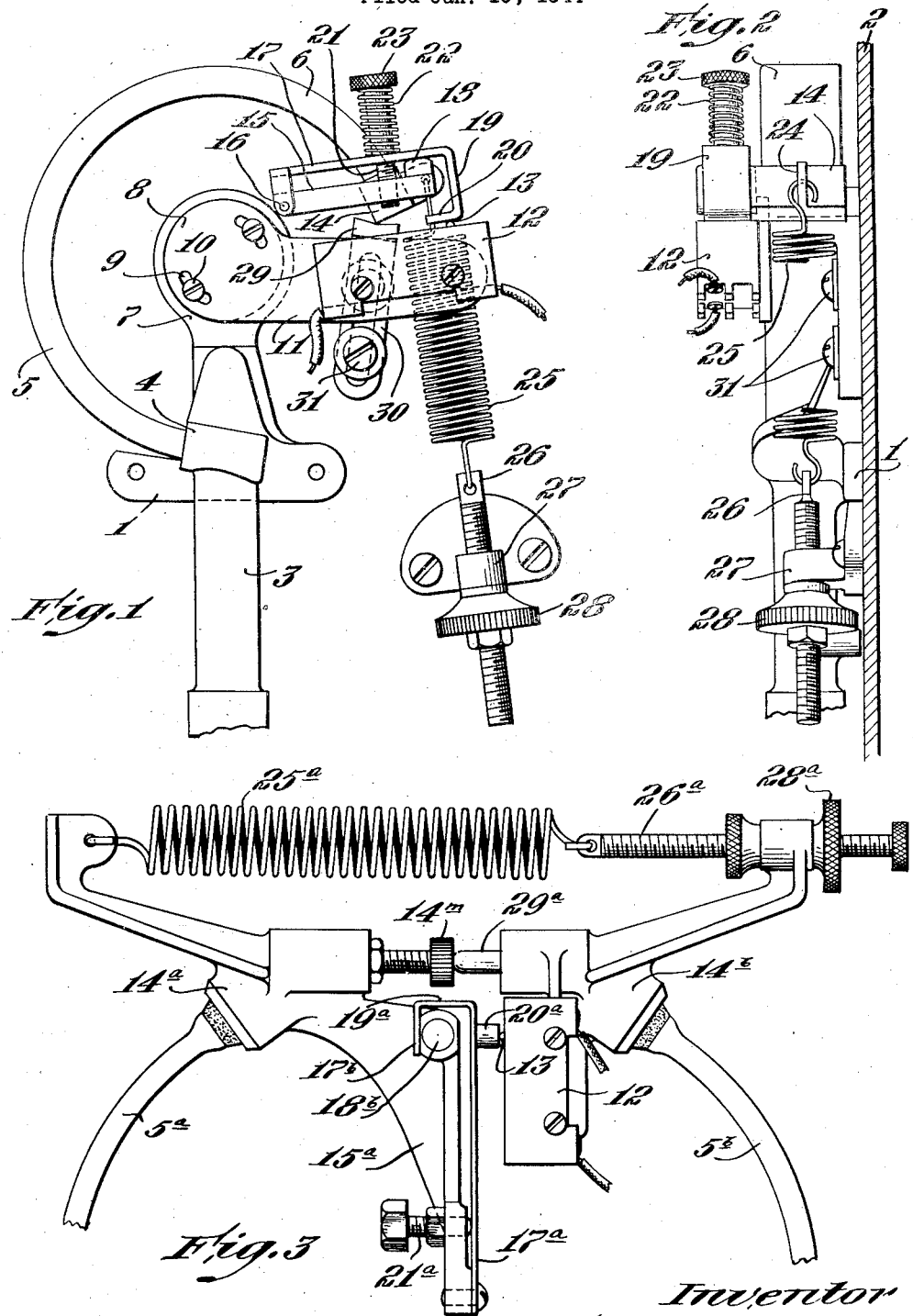
Inventor
Frank H. Hopkins
by Roberts Cushman & Grover
Att'ys.

Patented May 7, 1946

2,399,737

UNITED STATES PATENT OFFICE 2,399,737

PRESSURE ACTUATED CONTROL DEVICE

Frank H. Hopkins, Fairfield, Conn., assignor to Manning, Maxwell & Moore, Incorporated, New York, N. Y., a corporation of New Jersey Application January 19, 1944, Serial No. 518,796

11 Claims. (Cl. 200—81.8)

This invention pertains to pressure actuated control devices, in particular to control devices designed to provide for a predetermined, preferably adjustable, differential between stopping and starting pressures.

The novel construction and principle of operation involved in this invention is hereinafter disclosed for convenience in illustration and description as embodied in an automatic controller comprising an element, for example a Bourdon tube or its equivalent, which moves or changes its shape in accordance with variations in internal pressure to which it is subjected and by such movement determines or indicates the pressure in a boiler, reservoir, tank, or other receptacle to which the controller is connected. In those embodiments of the invention herein chosen for convenience in description the determination or regulation of the pressure in such a boiler, reservoir, tank or other receptacle is indirectly accomplished; the Bourdon tube or other pressure sensitive element making and breaking an electrical circuit and thereby, through suitable electromagnetic means, for example a motor, solenoid, magnet or the like, operating a pump, relief valve, or gate. Such a pump may for example be a pump for pumping water and/or air into the storage tank of domestic water systems, the control being so devised as to start the pump when the pressure in the system drops to a predetermined minimum and to stop the pump when the pressure has risen to a predetermined maximum. The patent to Hopkins No. 2,300,895, dated November 3, 1942, is illustrative of the employment of an automatic control of this general type especially adapted for use in such a domestic water supply system, the control employing an electrical switch of the snap-action type for making and breaking the pump circuit.

When a valve is the controlled element it may, for example, be a safety valve for a steam boiler, oil still, or the like, the valve being opened automatically to relieve excess pressure in the boiler or still, the pressure at which the valve opens being determined by the Bourdon tube or equivalent element of the control device.

As pointed out in the patent to Heiss No. 1,809,898, dated June 16, 1931, it is desirable in many branches of the engineering art freely to permit unrestrained progressive changes in some characteristic of a physical substance, for example temperature rise or fall; increase or decrease in fluid pressure; change in magnetic saturation; viscosity; or rate of fluid flow up to a predetermined point in such progressive change, and thereafter automatically to control, regulate, or observe further increments of change with great accuracy and precision. Thus when the controller of the present invention is designed to determine the operation of a magnetically actuated safety valve it is desirable that the controller respond with great accuracy to very slight changes in pressure within the working pressure range in order to avoid excessive blow-down of the boiler.

While the control mechanism disclosed in the Heiss patent has proven of the very greatest value, commercially speaking, in the steam engineering field, the particular mechanical embodiment of the underlying principle as disclosed in the Heiss patent is such that the instrument does not lend itself readily to use on shipboard where it would be subject to violent motion, since the Heiss controlling instrument makes use of pendulous switch contact levers whose normal mode of operation is interfered with when the device is mounted upon a ship and subjected to the rolling and pitching movements of the ship. On the other hand, in the automatic controller disclosed in the above patent to Hopkins (while devoid of any parts whose relative positions would be seriously disturbed by motions on the support on which the instrument is mounted) the adjustment of pressure differential involves the bending of parts, an operation which must be performed with great care and which requires much skill on the part of the performer.

One object of the present invention is to provide an automatic controller of the type referred to having provision for adjusting the differential between switch-opening and closing pressures but so designed that this variation in differential may be accomplished without requiring special skill, and by very small increments or decrements so as to provide extreme accuracy. A further object is to provide a controller of this type which is very sensitively responsive to variations in pressure within the working range and which embodies the principle of the Heiss patent above referred to, in that it employs an externally loaded Bourdon tube or the like, but at the same time is so devised and constructed that it is not substantially affected as to its operation even though mounted upon a support which is subjected to violent movement or vibration. Other and further objects and advantages of the invention will be pointed out in the following more detailed description and by reference to the accompanying drawing wherein Fig. 1 is a fragmentary front elevation of a control device according to the present invention, the enclosing casing being omitted;

Fig. 2 is a side elevation of the parts shown in Fig. 1 but showing a portion of the rear wall of the casing of the instrument; and Fig. 3 is a fragmentary front elevation of a modified construction wherein two Bourdon tubes are employed.

Referring to the drawing, the numeral 1 designates a rigid bracket, which may be a casting or the like, which is designed to be secured to a suitable support, for example to the rear wall 2 (Fig. 2) of a case designed to house the operating parts. The bracket 1 is integral with or fixed to a tubular connecting member 3 which usually terminates in a screw-threaded nipple portion (not shown) whereby the device may be secured directly or indirectly to a pressure fluid container, for example to a water storage tank or to a steam boiler. The bracket 1 also comprises a socket portion 4 in which is fixed, as for example by brazing, one end of the Bourdon tube 5. The free end or tip 6 of this tube moves in response to variations in the pressure within the tube. The bracket 1 is also preferably furnished with an upwardly directed portion terminating in a circular pad 7 to which is concentrically secured a disk-like member 8 by means of arcuate slots 9 and screws 10, thereby permitting the member 8 to be turned, more or less, relatively to the pad 7. The disk 8 is integral with an arm 11 which, as shown in Fig. 1, projects to the right and to a point beneath the movable tip 6 of the Bourdon tube. The distance between the tube tip and the arm 11 may be varied by turning the disk 8 relatively to the pad 7. The arm 11 constitutes a support for the casing 12 of a snap-action electrical switch, for example a switch of the so-called "Mu" type, the switch including an approximately vertical operating pin 13.

The tip 6 of the Bourdon tube is provided with a rigid bracket 14 whose forward edge is fixed to or integral with an elongate rigid support 15. A pivot pin 16 at the inner or left-hand end of the support 15 passes through openings in ears rigidly secured to or forming part of an actuating lever 17. The free end portion of this actuating lever is bent to provide the approximately vertical arm 19 and is again bent to provide the actuator 20 which is substantially parallel to the main part of the lever 17 and which directly overlies the upper end of the pin 13. A fixed stop or abutment 18 is carried by the support 15 and underlies the lever 17 so as to limit movement of the actuator 20 toward pin 13. A screw-threaded post 21 has threaded engagement with an opening in the rigid supporting element 15 and passes freely through an opening in the lever arm 17 and is embraced by a coil compression spring 22 whose lower end bears upon the upper surface of the lever arm 17 and whose opposite end engages the under side of a knurled actuating head 23 on the upper end of the post 21, the spring thus resiliently opposing movement of the actuator 20 in a direction away from pin 13.

The bracket 14 is provided with an ear 24 having an opening for the reception of the hooked upper end of a coiled tension spring 25 whose lower end is hooked into an opening in the upper end of screw-threaded rod 26 which passes freely through an opening in a bracket 27 secured to the support 2 and which is engaged, at a point below the bracket 27, by a screw-threaded knurled nut 28. The spring 25 tends to pull the tip 6 of the Bourdon tube downwardly as viewed in Fig. 1, but such movement is limited by a stop 29 which engages the lower corner of the bracket 14 and which is carried by an elongate slide member 30 having a slot which is engaged by screws 31 which enter the support 2. By adjusting the slide 30 the working pressure range of the Bourdon tube may be adjusted. By turning the nut 28 the load imposed by the spring 25 upon the Bourdon tube may be varied.

In the arrangement shown in Fig. 3, two Bourdon tubes 5$^a$ and 5$^b$ are employed. The tube 5$^a$ has a bracket 14$^a$ at its movable end while the tube 5$^b$ has a bracket 14$^b$ at its movable end. This bracket 14$^b$ supports the casing 12 of a snap switch provided with the horizontally movable actuator pin 13. The bracket 14$^a$, carried by the tube 5$^a$, has a downward extension 15$^a$ to which the lower end 17$^a$ of an elongate leaf spring is fixedly secured. This spring comprises a substantially vertical arm on which is mounted an actuator 20$^a$ disposed directly opposite to the outer end of the pin 13. Above this actuator 20$^a$ the spring is bent to provide a substantially horizontal portion 19$^a$ and is again bent to provide the vertical portion 17$^b$ which cooperates with a fixed stop post or abutment 18$^b$, carried by the bracket arm 15$^a$, to limit movement of actuator 20$^a$ toward pin 13. The spring is so devised that the part 17$^b$ normally tends to move away from the post 18$^b$. An adjusting screw 21$^a$ has threaded engagement with a portion of the bracket arm 15$^a$ and its tip contacts the lower portion 17$^a$ of the leaf spring. By adjusting the screw 21$^a$ the effective stiffness of the leaf spring may be varied as well as the normal distance between the member 17$^b$ and the post or abutment 18$^b$.

The bracket 14$^b$ is provided with the stop member 29$^a$ and the bracket 14$^a$ is provided with an adjustable, cooperating stop screw 14$^m$, the parts 14$^m$ and 29$^a$ being designed to limit approach of the brackets 14$^a$ and 14$^b$. A tension spring 25$^a$ is secured at one end to an arm of the bracket 14$^a$ and at its other end to a screw 26$^a$ which passes through an opening in an arm of the bracket 14$^b$ and which has threaded engagement with an adjusting nut 28$^a$ which may be turned to vary the load imposed by the spring 25$^a$.

Switches of the snap-action type such as herein referred to have definite operating characteristics. For example, in order to make the switch snap and thus shift the contacts, a certain pressure must first be built up against the operating pin or button of the switch. When the requisite pressure has thus been built up, it is then necessary to move the button or pin through a certain definite distance whereupon the switch snaps to move the contacts in one direction. Upon reduction of this force to a certain predetermined amount usually considerably above zero, the switch snaps automatically and moves the contacts in the opposite direction.

In the operation of the device shown in Fig. 1 the loading spring 25 and the stop 29 are so initially adjusted that the tip of the Bourdon tube will not move at all in response to increase in pressure until the pressure has reached the working range. The differential between switch-opening and closing pressure is determined by adjusting the screw 23 so as to vary the pressure which the spring 22 exerts on the lever arm 17. If, for example, the screw 23 be so adjusted that the spring 22 holds the arm 17 firmly against the stop member 18, there will be substantially no differential between opening and closing, since the actuator 20 will be substantially rigid relatively to the tip 6 of the tube and thus as the tube moves away from the switch 12 the contact 20 will leave the pin 13 and allow the switch 12 to close as soon as the force which holds the switch open is thus released. On the other hand, under receding pressure conditions, the contact element 20 will engage the pin 13 and open the switch immediately upon a decrease in pressure. However, if the screw 23 is backed off so that the spring 22 exerts but slight force on the lever arm 17 then, under receding pressure conditions, as the actuator 20 moves into engagement with the pin 13, the arm 17 will swing about the pivot 16 (in response to the opposition to movement exerted by the pin 13) so that the tip 6 of the tube will continue to move through a substantial distance before the spring 22 has been compressed sufficiently to cause the actuator 20 to move the pin 13 and break the switch circuit.

In the arrangement shown in Fig. 3 a similar adjustment of the differential is obtained by turning the screw 21ª. Such adjustment of screw 21ª varies the initial position of part 17ᵇ and the effective force of the leaf spring. While the approach of the actuator 20ª toward the pin 13 is limited by engagement by the part 17ᵇ with the part 18ᵇ, the effective resistance of the actuator 20ª to relative approach of the pin 13 varies with the setting of the screw 21ª. Thus if the screw 21ª is adjusted so as to force the leaf spring to the right and to bring the member 17ᵇ into contact with the part 18ᵇ there is a minimum differential between opening and closing of the switch. On the other hand, if the screw 21ª is backed off somewhat, the force of the leaf-spring becomes less effective, and thus as the actuator 20ª approaches and engages the pin 13, substantial relative movement of the tube tips may take place, due to drop in pressure, before the spring is sufficiently stressed to cause the actuator 20ª to operate the switch.

It will be observed that in both forms of the device a snap action switch is employed and that there are no parts which would be substantially affected in their operation by movement of the support 2 on which they are mounted. On the other hand, in both embodiments illustrated the differential range is readily varied simply by turning a screw so that little skill is required in making this adjustment.

While certain desirable embodiments of the invention have been shown by way of example, it is to be understood that the invention is broadly inclusive of any and all constructions falling within the terms of the appended claims.

I claim:

1. In combination, in a pressure-actuated control device, a Bourdon tube fixed at one end and having a tip which moves in response to pressure variations and having means imposing a predetermined load upon the tip to prevent movement of the latter at pressures below a predetermined value, an electrical switch of the snap-action type including an operating pin, means whereby the switch with its operating pin may be adjusted toward and from the tube tip, an actuating arm pivotally supported by the tube tip, said arm having an actuator element engageable with the switch operating pin, a rigid stop arranged to limit movement of the actuating arm toward the switch pin, and spring means opposing movement of the actuating arm away from the pin.

2. In combination with a snap-action switch of the kind having contacts which are relatively movable in one direction by the application of a predetermined force, and which relatively move in the opposite direction upon reduction of the force to a predetermined lesser value, the switch including a contact-operating member, motor means comprising an element which moves in response to variations in a given physical condition, an actuator carried by but movable relatively to said motor element and which is operative to transmit motion from said motor element to the contact-operating member of the switch, a stop carried by said movable motor element and which is operative to limit motion of the actuator toward the contact-operating member, a spring urging said actuator toward the contact-operating member and toward the stop, and adjustable means operative to vary the force exerted by the spring within the range of force requisite to close the switch contacts and to permit them to separate, respectively.

3. In combination, motor means comprising an element which moves in response to variations in a given physical condition, an electrical switch of the snap-action type which requires a predetermined force to close it but which opens upon reduction of said force to a predetermined value, said switch including a movable operating part, an actuator carried by but movable relatively to said movable motor element, said actuator being interposed between said motor element and switch-operating part and arranged to engage and to move the switch-operating part in response to movement of said motor element, a rigid stop carried by the movable motor element operative to limit movement of the actuator relatively to said motor element toward the switch-operating part, spring means opposing movement of the actuator away from the switch-operating part, and means for adjusting the force exerted by said spring means within the range of force requisite to close or permit the switch to open.

4. In combination in a pressure-actuated control device, a pressure motor having a part which moves in response to pressure variations, an electrical switch of the snap-action type including an operating pin and means whereby the switch with its operating pin may be adjusted toward and from said pressure motor, an actuator supported by but movable relatively to the movable motor part and which is engageable with the operating pin for moving the latter, means resiliently opposing movement of the actuator away from the switch-operating pin, stop means carried by the movable motor part and operative positively to limit movement of the actuator toward the operating pin, and adjustable means for varying the force exerted by said resilient means in opposing movement of the actuator away from the pin.

5. In combination in a pressure-actuated control device wherein a Bourdon tube, fixed at one end, has a tip which moves in response to internal pressure variations, means imposing a predetermined but variable load upon the tip to prevent movement of the latter at pressures below a predetermined value, an electrical switch of the snap-action type including an operating member, means normally supporting the switch with its operating member in fixed position and spaced from the tube tip, a lever pivoted at one end to a part carried by the tube tip, said lever being provided with an actuator element at its free end arranged to engage the operating member by relative approach of the tube tip and switch, a stop carried by said part of the tube tip engageable with the lever, thereby to limit movement of the actuator relatively to the tube tip in a direction toward the operating member, a spring opposing movement of the actuator away from the stop, and means to adjust the force exerted by the spring.

6. In combination in a pressure-actuated switch, a Bourdon tube fixed at one end and having a tip which moves in response to pressure variations, an electrical switch of the snap-action type including an operating pin, means normally supporting the switch in fixed position with its operating pin spaced from the tube tip, a lever pivoted at one end to a part carried by the tube tip, said lever having an actuator element at its free end which is engageable with the operating pin by relative approach of the tube tip and switch, a stop carried by the tube tip and engageable with the lever thereby to limit movement of the actuator relatively to the tube tip in a direction toward the operating pin, a rotary post having screw-threaded engagement with a part carried by the tube tip, said post passing freely through an opening in the lever, and a coiled spring embracing the post and pressing at one end against the lever, the post having an enlargement with which the other end of the spring engages, whereby, by rotation of the post, the tension of the spring may be varied.

7. In combination in a pressure-actuated switch, a pressure motor including a movable element which moves in response to pressure variations, an electrical switch of the snap-action type including an operating pin, means normally supporting the switch in fixed position with its actuating pin spaced from the movable motor element, a resilient arm fixed at one end to a part carried by the movable motor element, the arm having an actuator at its free end which engages the operating pin by relative approach of the movable motor element and switch, a stop carried by said part carried by the movable motor element engageable with the free end of the resilient actuator arm, and thereby limiting movement of the actuator relatively to the movable motor element in a direction toward the operating pin, and an adjustable abutment engaging the resilient arm at a point adjacent to the fixed end of the latter and operative to vary the effective stiffness of the arm, thereby to adjust the resistance of the actuator element to movement in a direction away from the operating pin.

8. In combination with a switch having an operating pin, an actuator engageable with the pin for imparting operative movement to the latter, pressure motor means including a movable part which forms a support for the actuator and whereby the actuator is moved toward and from the switch, the actuator being movable relatively to the support, resilient means interposed between the support and the actuator and which tends to move the actuator toward the pin but which, upon initial engagement of the actuator with the pin, permits the actuator to yield without effectively moving the pin until the force exerted by said resilient means attains a predetermined amount, a stop carried by the support and which is operative to limit movement of the actuator toward the pin by said resilient means, and means for varying the force which the resilient means offers to movement of the actuator in a direction away from the pin.

9. In combination in a pressure-actuated switch, a Bourdon tube fixed at one end and having a tip which moves in response to pressure variations, an electrical switch of the snap-action type including an operating pin, means supporting the switch, an actuator carried by and which is movable relatively to the tube tip and which is engaged with the operating pin by relative approach of the tube tip and switch, a spring which urges the actuator toward the pin, and adjustable means, including a rigid stop for the actuator carried by the tube tip, operative to vary the deflection rate of the spring from zero to a positive value thereby selectively to determine the rate of response of the switch.

10. In combination in a pressure-actuated control device, a Bourdon tube fixed at one end and having a tip which moves in response to pressure variations, an electrical switch of the snap-action type including an operating pin and means whereby the switch with its operating pin may be adjusted bodily toward and from the tube tip, an actuator supported by but movable relatively to the tube tip, and which is engageable with the operating pin by relative approach of the tube tip and switch, a spring which resiliently urges the actuator toward the operating pin, a stop carried by the tube tip for limiting movement of the actuator toward the pin by said spring, and means for varying the force exerted by the spring.

11. In combination with a switch having an operating pin, a movable actuator engageable with the pin for imparting operative movement to the latter, pressure motor means including a movable driving element for relatively moving the switch and actuator, resilient means tending to move the actuator toward the operating pin but permitting the actuator to yield when it is engaged by the operating pin, rigid stop means carried by said movable driving element of the motor and which is operative to limit movement of the actuator toward the pin by said resilient means, and adjustable means for varying the force exerted by said resilient means in the direction of the stop thereby to determine the amount of yield of the actuator, after engagement with the pin, before the pin is effectively moved by the actuator.

FRANK H. HOPKINS.